No. 727,428. PATENTED MAY 5, 1903.
H. S. PALMER.
MACHINE FOR MOLDING HOLLOW CONCRETE BUILDING BLOCKS.
APPLICATION FILED NOV. 12, 1902.
NO MODEL. 3 SHEETS—SHEET 1.
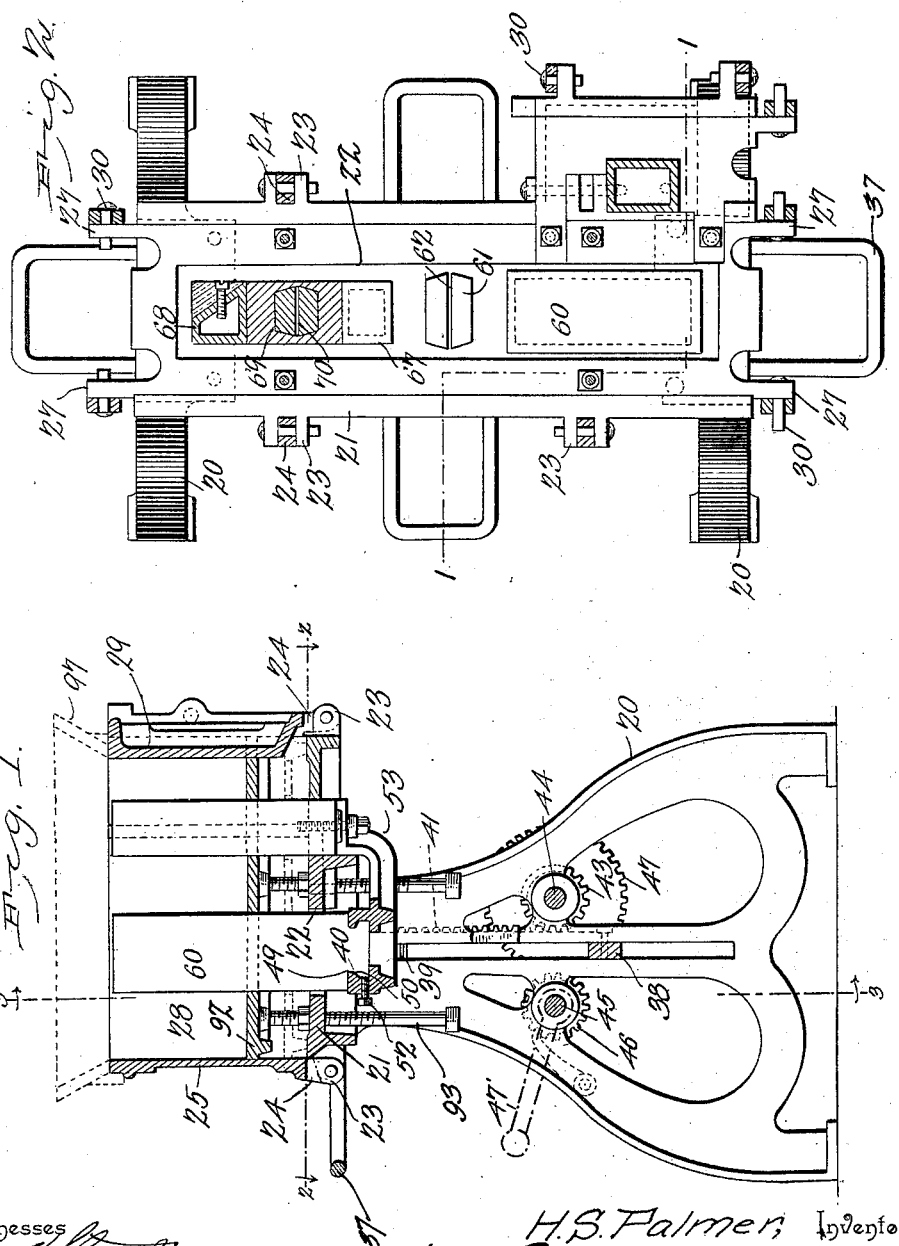
Witnesses
H. S. Palmer, Inventor
Attorneys No. 727,428. PATENTED MAY 5, 1903.
H. S. PALMER.
MACHINE FOR MOLDING HOLLOW CONCRETE BUILDING BLOCKS.
APPLICATION FILED NOV. 12, 1902.
NO MODEL. 3 SHEETS—SHEET 2.
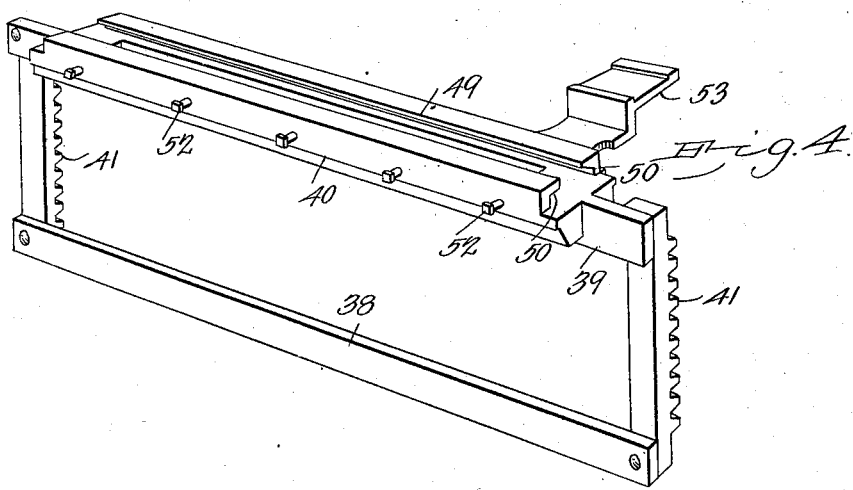

No. 727,428. PATENTED MAY 5, 1903.
H. S. PALMER.
MACHINE FOR MOLDING HOLLOW CONCRETE BUILDING BLOCKS.
APPLICATION FILED NOV. 12, 1902.
NO MODEL. 3 SHEETS—SHEET 3.
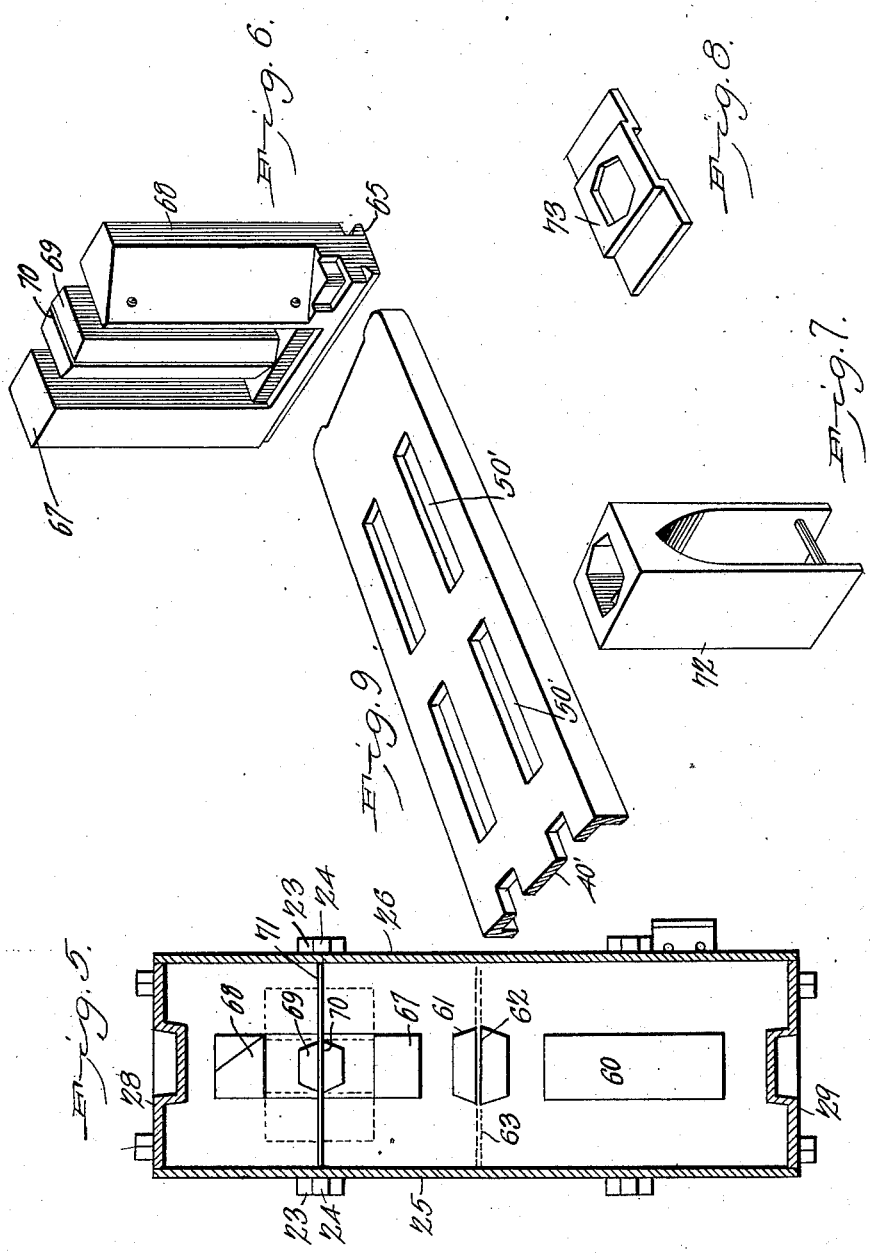

No. 727,428. Patented May 5, 1903.

UNITED STATES PATENT OFFICE.

HARMON S. PALMER, OF WASHINGTON, DISTRICT OF COLUMBIA.

MACHINE FOR MOLDING HOLLOW CONCRETE BUILDING-BLOCKS.

SPECIFICATION forming part of Letters Patent No. 727,428, dated May 5, 1903.

Original application filed May 29, 1902, Serial No. 109,550. Divided and this application filed November 12, 1902. Serial No. 131,033. (No model.)

*To all whom it may concern:*

Be it known that I, HARMON S. PALMER, a citizen of the United States, residing at Washington, District of Columbia, have invented a new and useful Machine for Molding Hollow Concrete Building-Blocks, of which the following is a specification.

This invention relates to certain improvements in mechanism of that class employed in the manufacture of building-blocks from concrete and similar materials, and has for its principal object to provide an improved machine whereby blocks of any desired shape and size may be made with less time and labor than with the mechanisms ordinarily employed for the purpose.

A further object of the invention is to so construct a machine that it may be employed for the manufacture of bricks of different size and contour; and a still further object is to provide for the adjustment of the parts in such manner as to permit the manufacture of blocks or bricks in half, quarter, and other sections and to vary the size of such blocks or bricks in length or width as may be required.

A still further object of the invention is to provide for the adjustment of the cores both as to shape and size, and to further provide for the adjustment of the cores to any desired point within the mold-box.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a transverse sectional elevation, on the line 1 1 of Fig. 2, of a machine for molding building-blocks constructed in accordance with the invention. Fig. 2 is a sectional plan view of the same on the line 2 2 of Fig. 1. Fig. 3 is a longitudinal sectional elevation of the machine on the line 3 3 of Fig. 1. Fig. 4 is a detail perspective view of the core-carrier. Fig. 5 is a sectional plan view of the molding-box, illustrating the arrangement of cores when it is desired to form sectional blocks or bricks. Figs. 6 and 7 are detached perspective views of a form of core which may be used for a variety of purposes. Fig. 8 is a similar view of a core-plate which may be employed when the core-sections shown in Figs. 6 and 7 are assembled to form a solid core, as shown in Fig. 2. Fig. 9 is a detail perspective view of the modified form of core-supporting plate.

Similar numerals of reference are employed to indicate corresponding parts throughout the several figures of the drawings.

The present application is a division of an application for United States Letters Patent for a machine for molding hollow concrete building-blocks filed by me on May 29, 1902, under Serial No. 109,550.

The main frame of the machine comprises opposite end standards 20 and an upper flanged bed-plate 21, the latter being provided with a longitudinally-disposed opening 22, extending for the entire length of the bed-plate between the inner faces of the standards to permit of the adjustment of the cores to any desired position in the length of the mold-box. The bed-plate is provided on each of its sides with pairs of lugs 23, to which are pivoted depending lugs 24, carried by the swinging side plates 25 and 26 of the mold-box, and at the ends of the base are similar lugs 27, to which are pivoted the end plates 28 and 29, the latter being arranged in such manner that its pivot-pintles 30 may be readily removed when it is desired to adjust said plate to the position shown in Fig. 5, the latter being the position assumed when the machine is adjusted for manufacture of brick of the ordinary character.

The end standards 20 are provided with vertical guiding-slots for the reception of a cross-bar 38 and the outwardly-projecting arms 39 of a core-carrying bar or plate 40, the cross-bar and arms 39 being rigidly secured together at points outside the slotted frames by rack-bars 41, adapted to intermesh with pinions 43, mounted on a shaft 44, adapted to suitable bearings in the standards. The standards are also provided with bearings for the reception of a shaft 45, provided at its opposite ends with pinions 46, adapted to intermesh with gears 47, secured to the shaft 44, and said shaft 45 is further provided with an operating-crank 47' (shown in dotted lines in Fig. 1) or a suitable belt or gear wheel which may be turned to impart a vertical reciprocating movement to the core-carrying bar or plate through the medium of the gears and rack-bars. The core bar or plate is approximately the same length as the bed of the machine and comprises two side members spaced by an elongated slot 49, the adjacent faces of such members being provided with dovetail guides 50, adapted to receive the correspondingly-shaped lower ends of the core members. The cores, which may be of any contour, are carried by the core bar or plate and are adjustable longitudinally thereof, suitable securing devices, as set-screws 52, being employed to lock the cores in any position to which they may be adjusted. The core-carrying bar is provided at a point near one end with a laterally-extending arm 53, to which a core may be secured to be employed when the machine is adjusted for the manufacture of a corner block or brick. During the process of manufacture of other forms of blocks or bricks this core-section is not in use. The cores employed in the manufacture of the bricks are of a size and character depending on the contour of the brick to be made, and in the manufacture of bricks or blocks of ordinary character it is preferred to employ three cores, two of which may be of a contour similar to that shown at 60 in Figs. 2 and 5 and an intermediate core-section 61, the latter being located centrally between the end plates and provided with a transversely-disposed slot 62, in which may be placed a division-plate 63, as indicated by dotted lines in Fig. 5. This arrangement permits of the manufacture of half bricks or blocks having a bonding-recess at each end and a central opening formed by the larger core-section. Half-bricks may be made separately, or the concrete or similar material may be placed on both sides of the division-plate to simultaneously form two half-bricks.

In one end of the mold-box is situated a core of the character more clearly shown in Figs. 6, 7, and 8 and comprising a base 65, adapted to the dovetailed guides of the core-carrying bar or plate and provided with three upwardly-projecting core members 67, 68, and 69, the latter being provided with a transversely-disposed slot 70, in which may be placed a division-plate 71, as indicated in Fig. 5, when it is desired to form brick or block sections of shorter or longer length than a half-section and quarter and three-quarter sections, or any desired fractional part of a brick or block may thus be made by adjusting the core longitudinally of the bar to place the division-plate 71 at the desired point intermediate of the end plates.

In some cases the core-carrying bar or plate may be of the construction shown in Fig. 9, the plate 40' in this instance being provided with a plurality of longitudinally-disposed slots 50' for the passage of set screws or bolts for locking the cores in any position to which they may be adjusted.

In order to provide for the formation of a practically solid core of the character shown at 60, I employ a filling-block 72, having a central orifice adapted to fit snugly around the section 69, the body of the filling-block being so shaped as to fill in the spaces between the various members 67, 68, and 69 and to form a practically solid core. When the core is used in this form, it is preferable to employ a bottom plate 73 of the character shown in Fig. 8, this plate being provided with a central opening of a contour corresponding to that of the core-section 69 and being first placed over the core-section 69 to form a support for the filling-block 72.

In the lower portion of the mold-box is placed a removable plate 92 of a contour corresponding to that of the box and provided with suitable openings for the passage of the cores. A number of these removable plates are supplied with each machine to suit the different adjustments of which the machine is capable, and each of the plates is provided with end recesses for the reception of the core members carried by the end plates of the mold and serving to form the bonding-recesses of the blocks. In the bottom of the mold-box are formed threaded openings for the passage of adjustable screws 93, which may be arranged with their wrench-engaging heads either inside or outside of the box and serve to support the removable bottom plates 92, the vertical adjustment in this plate permitting the formation of blocks of different thicknesses.

In the manufacture of the bricks the mold-box is first adjusted to the desired contour and the cores are placed in the elevated position. A hopper 97, such as indicated in dotted lines in Fig. 1, is then placed on the top of the mold-box and the concrete is filled in and tamped between the sides of the box and the cores. The hopper is then removed and the top of the concrete troweled and all surplus material removed. The cores are then lowered by means of the gearing, and the side and end plates are unlocked and turned to the horizontal position, where they rest upon the supports 37 during the removal of the bottom plate and the blocks. A new bottom plate is then placed in position and the parts readjusted for a second and similar operation. When fractional bricks are being made, the partitions are placed in the slots of the cores in such manner that their projected ends rest on the upper surface of the removable bottom plate, and when the mold has been filled and tamped the bottom plate is removed, together with the fractional bricks or blocks and the partition plate or plates.

The adjustability of the cores both as regards their changes in contour and the longitudinal movement on the core-carrying bar or plate permits the use of a single machine for the manufacture of bricks or blocks of any desired size or contour.

Having thus described my invention, what I claim is—

1. In a machine for molding hollow concrete building-blocks, the combination with a mold-box comprising a plurality of movable side and end members, and a longitudinally-slotted bed-plate, of a vertically-movable core-supporting bar, a plurality of core members adjustable longitudinally of said bar, means for clamping the core members in adjusted position, a removable bottom plate having openings for the passage of the core members and serving as a support for the molded block as the latter is removed from the machine, the upper ends of the core members being disposed in a horizontal plane with the upper edges of the side and end members when in operative position and being adjusted to a position below the plane of the upper surface of the bottom plate when in inoperative position.

2. In a machine for molding hollow concrete building-blocks, a mold-box comprising independently-movable side and end members, a longitudinally-slotted bed-plate, a vertically-movable core-support, core members carried by said support and adjustable longitudinally thereof to alter the contour of the blocks, and a removable bottom plate having openings for the passage of the core members and serving as a supporting agent for the molded blocks during the removal of the latter from the machine.

3. In a machine for molding hollow concrete building-blocks, the combination of the mold-box comprising a plurality of independently-movable side and end members, means for locking said members to each other to form the box, a longitudinally-slotted bed-plate, a core-supporting bar arranged under the bed-plate, means for vertically adjusting said bar, a plurality of core members supported by the bar and adjustable longitudinally thereof, means for locking said core members in position, the upper ends of said core members being in a common horizontal plane with the tops of the side and end members of the blocks when in operative position, and a removable bottom plate having openings for the passage of the core members and serving as a support for the molded block during the removal of the latter from the machine.

4. In a device of the class specified, the combination with a mold-box, of a core, said core comprising a base, a plurality of members spaced apart from each other and rigidly secured to said base, and a removable filling-block for changing the contour of said core.

5. In a device of the class specified, the combination with a mold-box, of a bottom plate having a core-opening, a core formed of a plurality of sections, a removable plate fitting over the central section to partly close the opening in the bottom plate, and a removable filling-block resting on said removable plate to fill the spaces between adjacent sections of the core.

In testimony that I claim the foregoing as my own I have hereto affixed my signature in the presence of two witnesses.

HARMON S. PALMER.

Witnesses:
   JNO. E. PARKER,
   FRANK S. APPLEMAN.